United States Patent [19]
Olkin

[11] Patent Number: 5,768,503
[45] Date of Patent: Jun. 16, 1998

[54] MIDDLEWARE PROGRAM WITH ENHANCED SECURITY

[75] Inventor: Terry Michael Olkin, Redwood Shores, Calif.

[73] Assignee: International Business Machines Corporation, Armonk, N.Y.

[21] Appl. No.: 533,466

[22] Filed: Sep. 25, 1995

[51] Int. Cl.$^6$ .................................................. G06F 11/00
[52] U.S. Cl. ............................. 395/187.01; 395/188.01
[58] Field of Search ........................... 395/187.01, 186, 395/188.01, 200.01, 200.03, 200.12, 200.14, 200.2; 380/4, 21, 23, 25

[56] References Cited

U.S. PATENT DOCUMENTS

| | | | |
|---|---|---|---|
| 4,799,153 | 1/1989 | Hann et al. | 395/187.01 |
| 5,204,961 | 4/1993 | Barlow | 395/725 |
| 5,241,594 | 8/1993 | Kung | 380/4 |
| 5,339,403 | 8/1994 | Parker et al. | 380/21 |
| 5,359,721 | 10/1994 | Kempf et al. | 395/187.01 |
| 5,440,744 | 8/1995 | Jacobson et al. | 395/650 |
| 5,497,463 | 3/1996 | Stein et al. | 395/600 |

OTHER PUBLICATIONS

McMahon, "Sesame V2 Public Key and Authorisation Extensions to Kerberos", Nwtwork and distributed System Security, Sympsium, IEEE, pp. 114–131, Apr. 1995.

Nueman et al., "Kerberos: An Authentication Service For Computer Networks", IEEE Communications Magazine, vol. 32, Iss. 9, pp. 33–38, Sep. 1994.

Ganesan, "Yaksha: Augmenting Kerberos With Public Key Cryptography", Network and Distributed System security Symposium, IEEE pp. 132–143, Apr. 1995.

Laferriere et al., "Authentication and Authorization Techniques in Distributed Systems", Carnahan Conference on Security Technology, IEEE, pp. 164–170, 1993.

Lunt, "Using Kerberos in Operation Systems", Globecom, IEEE, pp. 687–693, 1991.

*Primary Examiner*—Robert W. Beausoliel, Jr.
*Assistant Examiner*—Joseph E. Palys
*Attorney, Agent, or Firm*—Elmer Galbi; Mark S. Walker

[57] ABSTRACT

The authentication and security mechanism in a first program is used to access an application program which requires a different type of authentication and password. A server program runs in the same machine as the application program. The server program communicates with the first program and it is accessed and it authenticates the user utilizing the security and authentication mechanism of the first program. After the user ID of a user who desires access to the second program has been authenticated using the authentication mechanism of the first program, the server program (a) generates a temporary password for the authenticated user I.D., (b) changes the password for the authenticated user ID to the temporary password, (c) accesses the second program using the authenticated ID and the temporary password, and (d) receives data and/or commands from the first program using the security mechanism from the first program and transmits this data and/or commands to the second program and (e) receives data and/or commands from the second program and transmits the data and/or commands to the user using the security mechanism of the first program.

7 Claims, 4 Drawing Sheets

MIDDLEWARE PROGRAM WITH ENHANCED SECURITY

FIELD OF THE INVENTION

The present invention relates to computer networks and more particularly to integrating a system which use an individualized security protocol into a network that uses a distributed network security protocol.

BACKGROUND OF THE INVENTION

A new type of software generally termed "middleware" mediates between the large variety of hardware and software found in large heterogeneous computer networks. For example, in a large heterogeneous network, a single application program, such as a billing program, may utilize (i.e. call upon) software modules supplied by a dozen different suppliers, whose products may or may not be compatible with each other. Middleware programs coordinates (i.e. give harmony to) the individual components in a heterogeneous network. For a general discussion of middleware see *Business Week*, Jun. 25, 1995 and *Network World*, Volume 12, Number 23, Jun. 5, 1995.

Among the problems that must be addressed by middleware programs are "authentication" of users and "data protection" for transmitted data. Traditionally authentication in computer systems is provided by the use of passwords and sign-on I.D.'s. Traditionally data protection is provided by encryption. A large network may include a large number of different application programs each of which requires a separate password and a separate sign-on ID. FIG. 1 illustrates a typical prior art network. As shown in FIG. 1, a user 10 has a connection to a local computer 11 which is in turn connected to a network 12. The network in turn is connected to a number of systems which contain application programs 15A to 15E. The user can access and sign on to each of the applications 15A to 15A. Each of the applications 15A to 15E may require a separate sign-on ID and a separate password.

It is not uncommon for a single user to have a list of ten or even twenty sign-on ID's and passwords that the user must enter into the system at different times. Posting a list of sign-on ID's and passwords near a terminal is a terrible security risk; however, it frequently happens.

A group of companies including Hitachi, Hewlett Packard, Digital Equipment Corporation and IBM founded an organization called the OSF (Open Software Foundation) which developed a technology and architecture called DCE (Distributed Computer Environment). DCE allows interoperability in a network between heterogeneous platforms and operating systems. DCE establishes a standard cooperative computing architecture that connects dissimilar computers and that shares applications, information, and computing resources across a network. DCE provides programming services which support the development of applications without regard to the underlying complexity of the computing network. DCE includes a Security service, a Directory service, Remote Procedure calls, etc. The security service in DCE includes what is called Kerberos authentication (see Kerberos, *An Authentication Service for Computer Networks*, IEEE Communications Magazine, v32, n9, September 1994, p 33–38 and *Security Architecture for Distributed Systems*, Computer Communications, v17,n7, July 1994, p 492–500). The DCE security service allows a user to utilize a single ID and password to access a number of different application programs in a network.

FIG. 2 illustrates a network which uses a DCE compliant protocol a user 210 has a connection to a local system 211 which is connected to a network 212. The DCE network 212 is in turn connected to a number of DCE compliant applications 215A to 215D and to a non DCE compliant application 215E. Non DCE compliant application 215E may for example be an Oracle data base. The DCE network provides a number of facilities including log-on security, data encryption, single sign on (SSO) access to network applications, and centralized directory services. Users only need to log in once, with one password in order to access the network and various DCE compliant applications 215A to 215B which are connected to the network. Since the DCE network uses a Kerberos authentication system, with respect to applications 215A to 215D, users are securely authenticated and yet passwords are never sent across the network.

One shortcoming of a DCE network is that for the DCE security features to work properly, all of the applications on the network must conform to the requirements of the DCE technology. If, for example, a network includes an application which uses a proprietary log-on and password system, (such as an Oracle or a Sybase database) the user will have to use a separate and distinct ID and password unique to these database programs. Furthermore, contrary to the usual DCE practice, where a network is used to connect to a non DCE compliant application, (that is, to an application which uses a proprietary sign-on and password system) the log-on and the password must be sent across the network. Thus in order for user 210 to access non DCE application 215E, the user 210 must send a sign-on I.D. and a password across the network 212 where they may be intercepted or compromised.

SUMMARY OF THE INVENTION

The present invention provides a method and apparatus for integrating a programming system which uses a special proprietary security protocol into a network which uses a distributed network security protocol. The present invention utilizes the authentication and security mechanism in a first program to access a second program which requires a different type of authentication and password. The user does not have access to or even know the ID and password utilized to access the second program and the ID and password used to access the second program (a) is never transmitted out of the computer where the second program is resident and (b) only exits in memory associated with the present invention for a very short time thereby providing security from interception.

The present invention provides a server program which runs in the same machine where the application to be accessed is running. The server program communicates with the first program and it is accessed and it authenticates the user utilizing the security and authentication mechanism of the first program. After a user who desires access to the second program has been authenticated using the authentication mechanism of the first program, the server program (a) generates a temporary password for the authenticated user I.D., (b) changes the password for the authenticated user ID to the temporary password, (c) accesses the second program using the authenticated ID and the temporary password, and (d) receives data and/or commands from the first program using the security mechanism from the first program and transmits this data and/or commands to the second program and (e) receives data and/or commands from the second program and transmits the data and/or commands to the user using the security mechanism of the first program.

DETAILED DESCRIPTION OF A PREFERRED EMBODIMENT

Figure 3:
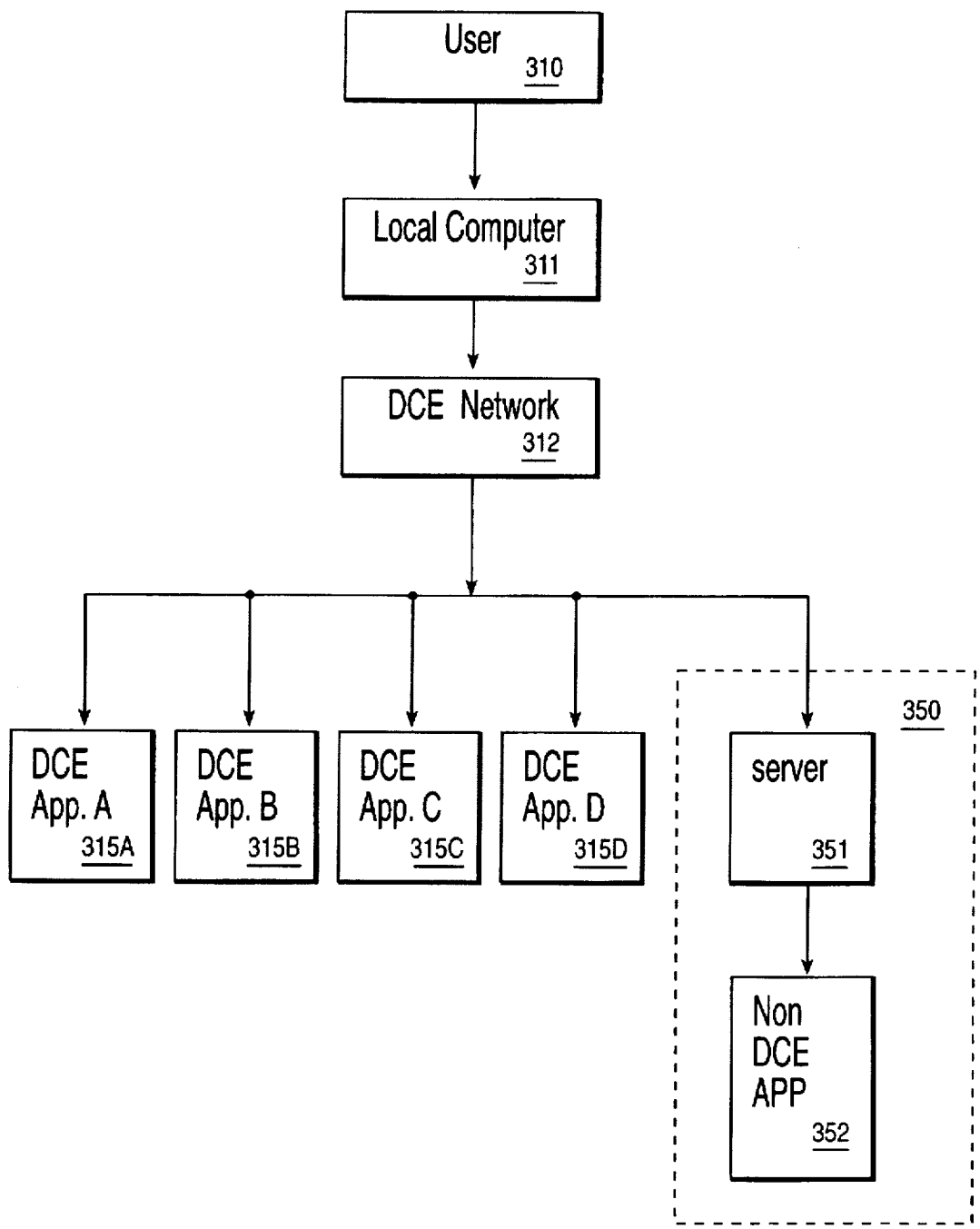
FIG. 3 is a block diagram of a system which incorporates the present invention.

A block diagram of a system which incorporates a preferred embodiment of the present invention is shown in FIG. 3. As shown in FIG. 3, user 310 has a connection to a local computer 311 which is connected to DCE compliant network 312. The DCE compliant network 312 conforms to the standards published by the Open Software Foundation for "Distributed Computing Environment" (DCE) networks. Network 312 includes the DCE data sharing services and more particularly the DCE security services, DCE centralized directory services, and DCE remote procedure calls. Several such network operating systems are commercially available. For Example IBM Corp markets such a network operating system under the name "SNA", Digital Equipment Corp. markets such a network operating system under the name "Pathworks", and Novell Corp markets such a network operating system under the name "Netware". Network 312 is connected to a number of applications 315A to 315D each of which includes a DCE compliant API (Application Programming Interface). Since these applications are DCE compliant they can therefore utilize the DCE Kerberos authentication mechanism and hence relative to these applications no log-on names and passwords ever pass through the network where they can be compromised.

Application 352 does not have a DCE compliant API. Application 352 may for example be a commercially available database program of the type marketed by Oracle Corporation of Redwood Shores, Calif. or a database program of the type marketed by Sybase Corporation of Emoryville, Calif. Such data base programs are respectively referred to as Oracle or Sysbase databases and they are widely used. In order to access or use application 352, a user must supply an ID and a password that conform to ID's and passwords previously established in the program 352 by what is generally termed a "privileged" sign-on. A privileged sign-on has its own ID and password. When a privileged sign-on accesses the program 352, the privileged sign-on has the power or authority to establish new IDs which can access the program 352 and it also has the power or authority to establish or change the password or other IDs. For example application 352 recognizes a "Change Password" command. However, application 352 will not execute this command if it is issued by a regular sign-on. Such a command will only be executed by application 352 if the command is issued by a privileged sign-on.

Figure 1:
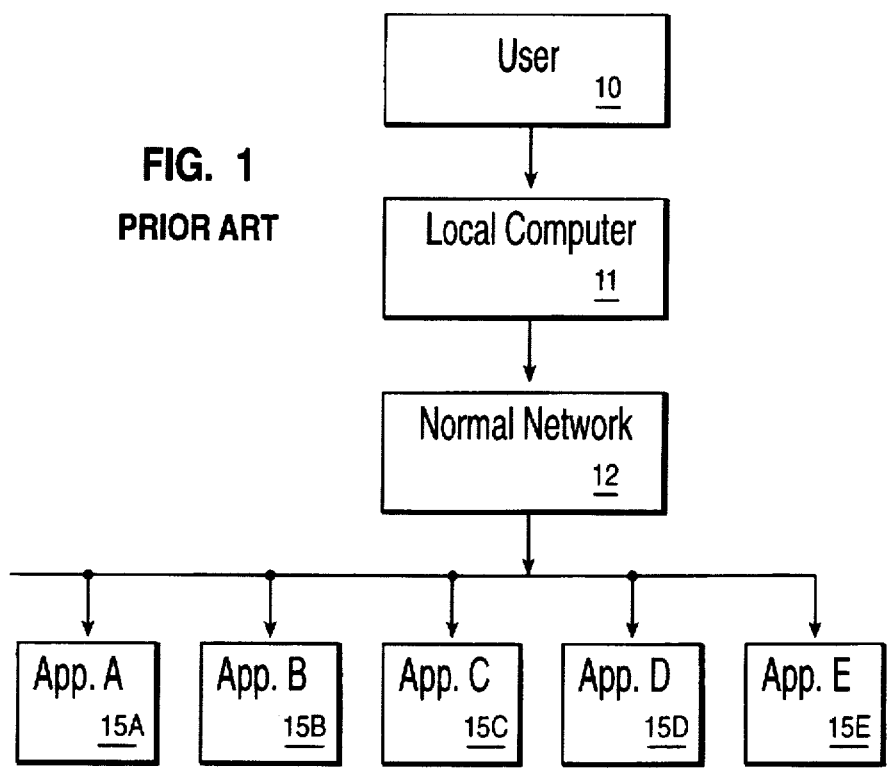
FIG. 1 is a diagram of a prior art network where the user must sign on the each application program.
Figure 2:
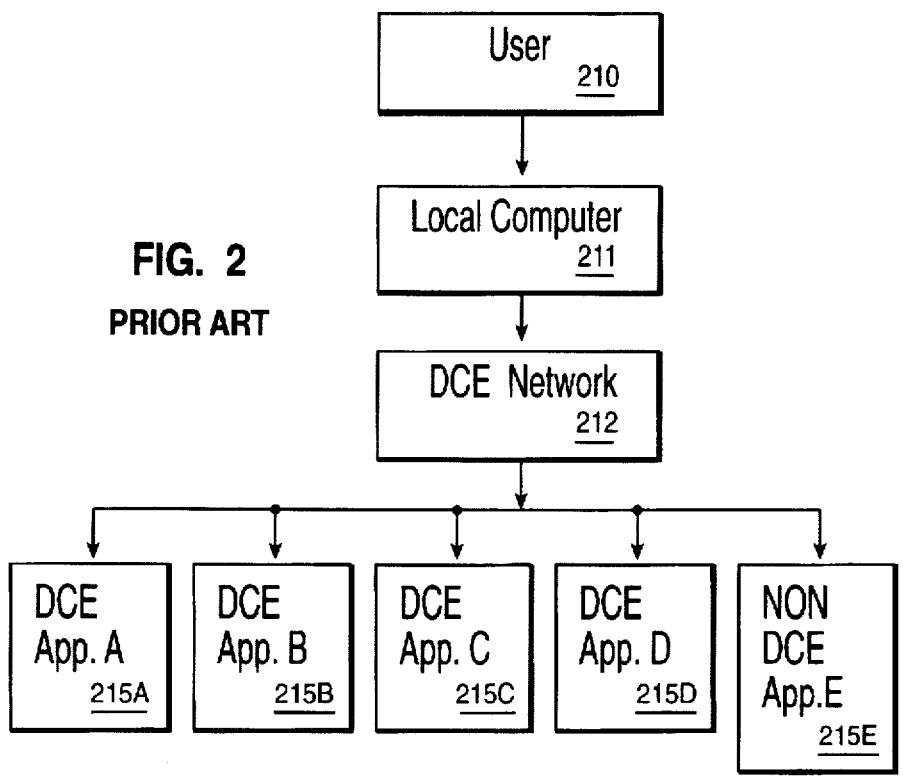
FIG. 2 is a block diagram of a prior art DEC network.

If an application program such as application program 352 is directly connected to a DCE compliant network, as is the application 215E shown in FIG. 2, the authentication and security procedures of the DCE network can not be used to access program 352. If program 352 were directly connected to a DCE compliant network, as is application 215E shown in FIG. 2, the program would have to be accessed by sending a separate sign-on ID and a separate password over the network. The reasons for this is that application programs such programs 215E and 352 (which may for example be commercially available Oracle or Sysbase data base programs) include their own proprietary authentication and security procedures. Such program do not conform to the DCE interface specifications. Thus when programs such as program 215E are directly connected to a network, a user who wants to log on to these programs must send a sign-on ID and a password over the network to the programs. There are at least two disadvantages to such a procedure. First, it presents, security risk and second it is inconvenient.

With applicant's invention a program or server 351 is positioned between the DCE compliant network 312 and the non DCE compliant application 352.

Figure 4:
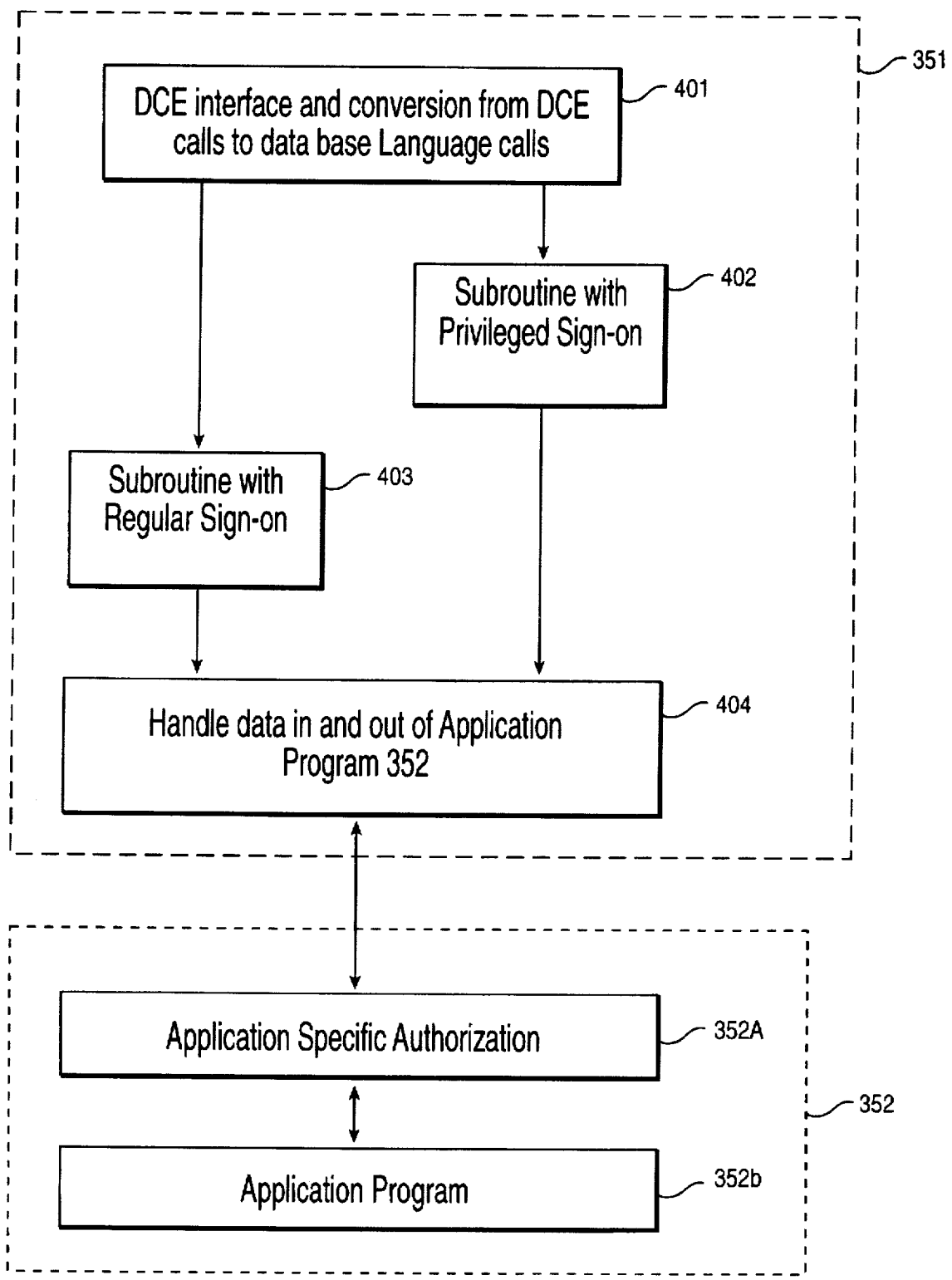
FIG. 4 is a block diagram of the server program.

The server 351 physically resides in the same machine 350 as does the application 352. Thus communications between the server 351 and the application 352 never leave the confines of a single piece of hardware. As shown in FIG. 4, the server 351 includes, (1) a DCE compliant interface 401 which translates calls transmitted by DCE network 312 to calls in the language utilized by application 352, (2) a thread or subroutine 402 which has coded therein a privileged sign-on to the application 352, (3) a thread or subroutine 403 which signs on to the application 352 as a normal user, and subroutine 404 which handles communication to and from DCE interface 401 and application 352.

As shown in FIG. 4, application 352 includes an application specific authentication mechanism 352A, which controls access to the main application program 352B. Commercial programs such as Oracle data base programs have such application specific authentication mechanisms.

For ease of reference, the privileged sign-on will be herein referred to as sign-on "Y" and the normal user sign-on will be referred to as sign-on "X". In fact the sign-ons X and Y would have normal multidigit IDs as required by specifications of application 352. The nature of the privilege possessed by sign-on Y is that user Y can change the password of sign-on X.

Figure 5:
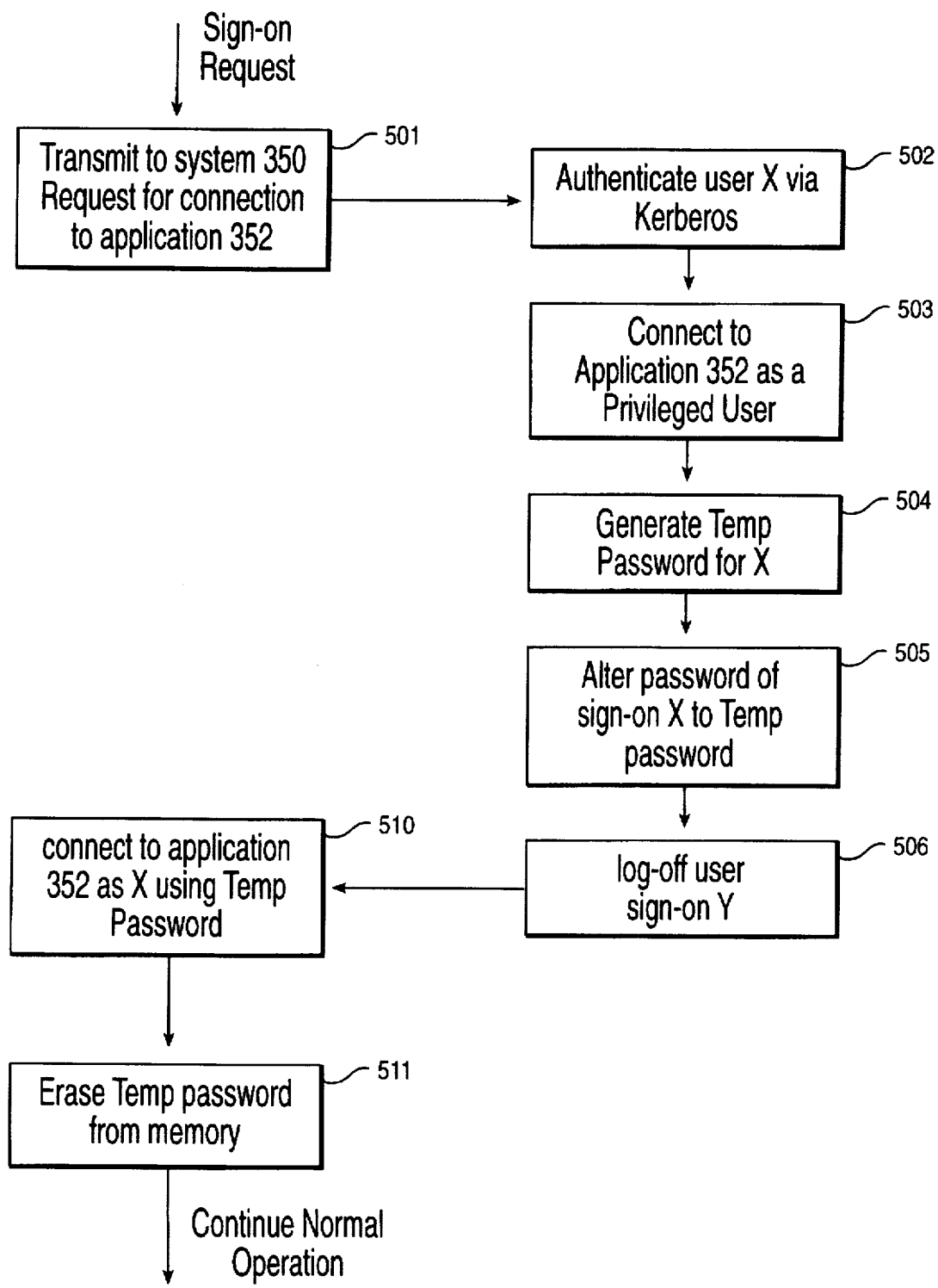
FIG. 5 is a flow diagram showing the operation of the invention.

The systems operates as shown in FIG. 5. When user 310 attempts to access the application 352, using ID X, the request is transferred to system 350 using the normal DCE Kerberos security (as shown by block 501). The server 351 which is in system 350 authenticates the ID X using the normal DCE Kerberos security procedures (block 502). These procedures are such that neither a password nor a user ID is transmitted over the network where it could be intercepted. The procedures and mechanism by which this is accomplished are described in the published literature (for example see the previously referenced technical paper).

Next as indicated by block 503, subroutine 402 signs on to the application 352 as user Y using a password that is securely stored in subroutine 402 (which is stored in computer 350). Subroutine 402 also generates a new temporary password using a random procedure (block 504). When user Y is signed on to the application 352, user Y changes the password for a user X to the temporary password that was created (block 505). User Y then signs off from the application 352 (block 506). Next subroutine 403 signs-on to application 352 as user X using the newly created password (block 510). The new password is then erased as indicated by block 511.

Once user X is signed on to application 352, commands and data are exchanged between user 310 and server 351 through DCE network 312 using the normal DCE security procedures (block 512). Server 351 translates and exchanges commands and data with the interface 404 in a non secure manner; however, this is not a security risk since these transmissions are inside a single machine 350.

The normal user ID has heretofore be referred to as user X. If for example user 310 is identified by user ID "JOE53" when servers 351 in machine 350 receives a request to access data base 352 from user "JOE53", the server 351 would authenticate that the request in fact came from user 310 using the normal DCE Kerberos authentication procedure. The privileged sign-on would change the password in data base 352 for user ID "JOE53"(block 505) and then sign on to the data base 352 using the user ID "JOE53" and the new temporary password. Subsequent commands and requests from user 310 identified by ID "JOE53" would be passed to the data base 352 and data and other information from data base 352 directed to user "JOE53" would be sent over the network to user 310 who is identified as user "JOE53". Thus with the embodiment of the invention shown herein the mapping from the ID of user 310 to the ID of the user sign-on for application 352 is a one to one mapping. It is noted that other more complex mapping could also be used.

The specific embodiment of the invention shown herein is a system that includes a network that uses a DCE security system and an application 352 which does not support the DCE security convention. It is noted that the invention could also be used with any first program having a first security protocol and any second program having a different security protocol.

It is also noted that the term subroutine refers to a series of computer instructions which performs a particular task. This term subroutine is synonymous with the terms "thread", "programming module" and "server". While there are differences in nuance between these terms, as used herein each of these terms refers to a series of programming instructions which perform a particular function.

While the invention has been shown and described with respect to a preferred embodiment thereof, it should be understood that various changes in forma and detail may be made without departing from the spirit and scope of the invention.

We claim:

1. A distributed computer system including, a network operating program that includes a distributed network security protocol, an application program that includes a second security protocol, a first sign-on ID and a second sign-on ID, said second sign-on ID having an associated password, said first sign-on ID being a privileged ID which can change said password of said second sign-on ID, and a server connected to a network using said distributed network security protocol, said server including means for signing on to said application program using said second security protocol and said first ID and for changing the password of said second ID to a temporary password, means for signing on to said application program using said second security protocol, said second ID and said temporary password, and means for passing data between said server and said network using said network security protocol.

2. The system recited in claim 1 wherein said network operating program conforms to the specification for a DCE (Distributed Computer Environment) program.

3. The system recited in claim 1 wherein said distributed network security protocol is a Kerberos protocol.

4. The system recited in claim 1 including an application computer, said application program and said server both being located in said application computer.

5. In a distributed computer system that includes a network operating program that includes a distributed network security protocol, and an application program that includes a second security protocol, said application program including a first sign-on ID and a second sign-on ID, said second sign-on ID having an associated password, said first sign-on ID being a privileged ID which can change the password of said second sign-on ID, the improvement comprising;

a server connected to a network using said distributed network security protocol, said server including means for signing on to said application program using said second security protocol and said first ID and for changing the password of said second ID to a temporary password, means for signing on to said application program using said second security protocol, said second ID and said temporary password, and means for passing data between said server and said network using said network security protocol whereby data passes from said network to said server using said distributed network protocol and between said server and said application program using said second security protocol.

6. The system recited in claim 5 wherein said network operating program conforms to the specification for a DCE (Distributed Computer Environment) program.

7. The system recited in claim 5 wherein said distributed network security protocol is a Kerberos protocol.

* * * * *